US012560336B2

(12) United States Patent
Henrici et al.

(10) Patent No.: US 12,560,336 B2
(45) Date of Patent: Feb. 24, 2026

(54) COOKING APPARATUS LIGHT

(71) Applicant: BJB GmbH & Co. KG, Arnsberg (DE)

(72) Inventors: Philipp Henrici, Arnsberg (DE); Olaf Baumeister, Sundern (DE); Matthias Mietner, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 413 days.

(21) Appl. No.: 18/227,044

(22) Filed: Jul. 27, 2023

(65) Prior Publication Data

US 2024/0060649 A1     Feb. 22, 2024

(51) Int. Cl.
*F21V 8/00*          (2006.01)
*F24C 15/00*          (2006.01)

(52) U.S. Cl.
CPC .......... *F24C 15/008* (2013.01); *G02B 6/0005* (2013.01)

(58) Field of Classification Search
CPC ...... F24C 15/008; F21V 21/00; G02B 6/0005
USPC ..................................................... 126/273 R
See application file for complete search history.

(56) References Cited

U.S. PATENT DOCUMENTS

| | | | | |
|---|---|---|---|---|
| 3,435,896 A | * | 4/1969 | Williams | .................. E03B 5/06 |
| | | | | 137/376 |
| 4,003,399 A | * | 1/1977 | Fischer | ................ F16K 15/044 |
| | | | | 4/675 |

| | | | | |
|---|---|---|---|---|
| 4,814,952 A | * | 3/1989 | Hammerl | .............. F24C 15/008 |
| | | | | 313/271 |
| 2014/0265324 A1 | * | 9/2014 | McAlister | ............. F16L 21/035 |
| | | | | 285/355 |
| 2018/0259193 A1 | * | 9/2018 | Lee | ......................... F21V 3/049 |
| 2021/0127885 A1 | | 5/2021 | Baumeister | |
| 2022/0240355 A1 | * | 7/2022 | Henrici | .............. F21V 33/0044 |

FOREIGN PATENT DOCUMENTS

| | | |
|---|---|---|
| DE | 2937499 | 5/1980 |
| DE | 102015003269 A1 | 9/2016 |
| EP | 3820249 A1 | 8/2020 |
| EP | 4033861 A1 | 7/2022 |
| GM | 7436616 | 1/1975 |

* cited by examiner

*Primary Examiner* — Avinash A Savani
(74) *Attorney, Agent, or Firm* — Von Rohrscheidt Patents

(57)          ABSTRACT

A seal arrangement for an illumination device of a cooking apparatus, the seal arrangement comprising: a support element including a receiving borehole that penetrates the support element from top to bottom so that a light conductor rod is insertable into the receiving borehole in an insertion direction; a dead hole having a dead hole diameter that is greater than a receiving bore hole diameter of the receiving borehole and arranged concentric with the receiving borehole in the support element wherein a dead hole opening of the dead hole coincides with an inlet opening of the receiving borehole that is arranged upstream in the insertion direction; a first support surface that is formed by a base of the dead hole and that envelopes the receiving borehole in an annular shape where the receiving borehole penetrates the base of the dead hole.

8 Claims, 5 Drawing Sheets

COOKING APPARATUS LIGHT

RELATED APPLICATIONS

This application claims priority from and incorporates by reference German Patent Application DE 10 2022 120 562.2 filed on Aug. 16, 2022.

FIELD OF THE INVENTION

The invention relates to a seal arrangement of an illumination device of a cooking apparatus.

BACKGROUND OF THE INVENTION

There is a plethora of different cooking apparatus types for preparing food for private homes, restaurants and commercial kitchens. These are in particular ovens, steam cookers and microwave ovens. In particular in private homes there are two contrary tendencies. On the one hand side, consumers want to be able to use any type of cooking in order to be able to use a complete bandwidth of food preparation starting with prefabricated food products (convenience food) in a microwave oven and standard dishes in an oven and particularly gentle vegetable and fish cooking in a steam cooker. On the other hand side, private homes do less and less cooking and there is no space for a large number of cooking apparatuses.

Manufacturers have therefore started to produce combination units. In particular ovens and microwave ovens have been combined in a combination unit.

Cooking apparatus lighting in cooking apparatus is particularly important. It facilitates watching the cooking process and optically controlling the cooking progress by illuminating the material to be cooked in an optimum manner. Modern illuminants, in particular LEDs, facilitate novel illumination concepts, however, apparatus design has to be adapted accordingly.

Thus, EP 3 820 249 A1 by the applicant shows a seal arrangement for a light conductor rod. The seal arrangement is located in a recess of the cooking apparatus wall and receives the light conductor rod. A graphite ring serves as the seal element and circumferentially envelopes the light conductor rod and prevents cooking vapors from exiting from the cooking cavity through the illumination opening in the cooking cavity wall. The graphite ring is slotted and provided with minimum undersize so that a light conductor rod inserted into the graphite ring expands the graphite ring by a minimum amount so that reset forces of the graphite ring cause a circumferential contact of the graphite ring at the glass rod. The graphite ring is fabricated with high dimensional precision so that the heat expansion of the graphite ring causes a reduction or a closure of the slot at typical cooking temperatures. Advantageously the seal is resistant to pyrolysis and resistant to the temperatures of up to 500 degrees C. that are common with pyrolysis.

A combination unit that includes a steam cooking function, in particular a combination unit which combines the oven, microwave and steam cooking function requires a new type of seal which also holds up to a steam pressure generated in the cooking cavity.

BRIEF SUMMARY OF THE INVENTION

Thus, it is an object of the invention to provide a corresponding seal arrangement which reliably seals the pass-through opening for an illumination device when a light conductor rod is arranged in a pyrolysis capable oven within cooking function so that the pass-through opening is reliably sealed towards an outside of the cooking cavity.

Furthermore, it is an object of the invention to provide an accordingly configured cooking apparatus light and a corresponding cooking apparatus.

The object is achieved by a seal arrangement for an illumination device of a cooking apparatus, the seal arrangement comprising: a support element including a receiving borehole that penetrates the support element from top to bottom so that a light conductor rod is insertable into the receiving borehole in an insertion direction; a dead hole having a dead hole diameter that is greater than a receiving bore hole diameter of the receiving borehole and arranged concentric with the receiving borehole in the support element wherein a dead hole opening of the dead hole coincides with an inlet opening of the receiving borehole that is arranged upstream in the insertion direction; a first support surface that is formed by a base of the dead hole and that envelopes the receiving borehole in an annular shape where the receiving borehole penetrates the base of the dead hole; an annular receiving groove that is arranged concentric with the receiving borehole and includes a receiving groove opening that is configured at a bottom of the support element viewed in the insertion direction so that the receiving groove opening is oriented opposite to the dead hole opening; an anchor spout that originates from a bottom side of the support element and that is arranged concentric with the receiving borehole; a crimp ring that is fixable in the dead hole; an anchor ring that is attachable at the anchor spout; a first seal ring that is arranged in the dead hole and contacts the first support surface wherein a ring cavity diameter of a ring cavity of the first seal ring substantially corresponds to the receiving borehole diameter of the receiving borehole; a second seal ring arranged in the annular receiving groove with an oversize relative to an axial depth of the annular receiving groove, wherein the crimp ring fixed in the dead hole imparts a first axial sealing force upon the first seal ring, and wherein the anchor ring attached at the anchor spout imparts a second axial sealing force upon the second seal ring.

The seal arrangement according to the invention achieves the object of the invention by combining the essential features of the independent claim. The support element includes two seal elements thus the first seal ring and the second seal ring, wherein the first seal ring arranged in the dead hole seals against a light conductor rod that is to be inserted. The second seal ring seals relative to the cooking apparatus wall. Thus, the second seal ring contacts a side of the cooking apparatus wall that is oriented away from the cooking cavity. By the same token, the first seal ring is also arranged on a side that is oriented away from the cooking cavity. This reduces the thermal load of the seal rings during normal operations, in particular when pyrolysis is performed in pyrolysis capable apparatuses.

Both seal rings achieve their sealing effect by the crimp ring or the anchor ring imparting a sealing force upon the respective seal ring. The sealing force causes a deformation of the respective seal ring and causes the first seal ring to contact the light conductor rod tight and causes the cooking cavity wall to contact the second seal ring tight.

Thus, the seal rings are formed from elastic materials, wherein the seal rings are configured from high temperature resistant elastomeric materials or configured in particular as reset elastic hybrid components for pyrolysis capable units for an application in oven combination units.

The arrangement of the seal rings in a common support element reduces component count and facilitates assembly. Thus, the anchor spout advantageously penetrates an opening in the cooking cavity wall of the cooking apparatus. The anchor ring fixed at the anchor spout mechanically supports the seal arrangement and optionally also the lamp supported therein at the cooking cavity wall.

The support element, the crimp ring and the anchor ring are advantageously configured as ceramic components.

Advantageously the crimp ring is introducible into the dead hole by a first threaded pair of crimp ring and dead hole wall in the seal arrangement.

Analogously the anchor ring is attachable at the anchor spout by a second thread pairing of anchor ring and anchor spout wall.

It is an essential advantage of the fixation of crimp ring and anchor ring at the respective opposite part by a thread pairing since it facilitates compensating fabrication tolerances when assembling the seal arrangement and attaching it at a cooking cavity wall.

However, when the support element and the crimp ring and the anchor ring are made from ceramic material it is possible to fix the crimp ring and the anchor ring at the support element by interlocking connections. When the interlocking devices facilitate plural interlocking positions in a depth measured in the insertion direction these interlocking connections can also compensate material tolerances and thus impart a constant sealing force upon the sealing surfaces.

Furthermore, a support ring is arranged between the crimp ring and the first seal ring and transfers the sealing force from the crimp ring to the seal ring.

This type of support ring prevents a torsion deformation of the first seal ring through the torque applied to the first seal ring through the crimp ring when using a thread pairing. Additionally, the support ring prevents that tightening torques are falsified through friction between crimp ring and seal ring.

The object is also achieved by a light for a cooking apparatus, comprising: a light conductor rod inserted into the receiving borehole; a first seal ring which is imparted with a diameter contraction of the annular cavity through the sealing force of the crimp ring and which contacts and seals at the outer diameter of the light conductor rod.

The object is also achieved by a cooking apparatus, comprising: an opening in a cooking cavity wall, wherein an anchor spout including a light conductor rod inserted therein passes through the opening in the cooking cavity wall; a second seal ring that contacts a surface of the cooking cavity wall wherein the second seal ring is axially compressed through a sealing force of the anchor ring and seals at the cooking cavity wall and in the receiving groove.

As recited supra, it is advantageous when the two seal rings are arranged at a side of the cooking cavity wall that is oriented away from the cooking cavity. Besides providing less temperature loading, there is also reduced loading with cooking vapors so that a contamination and consequently a caking and adhesion of the seal ring at the cooking cavity wall is prevented.

Particularly advantageously the light is mechanically supported by fixing the seal arrangement at the cooking cavity wall, in particular by the light conductor rod supported in the receiving borehole.

BRIEF DESCRIPTION OF THE DRAWINGS

Further advantages of the invention will be apparent from the subsequent description of an advantageous embodiment with reference to drawings figures, wherein.

DETAILED DESCRIPTION OF THE INVENTION

Figure 1:
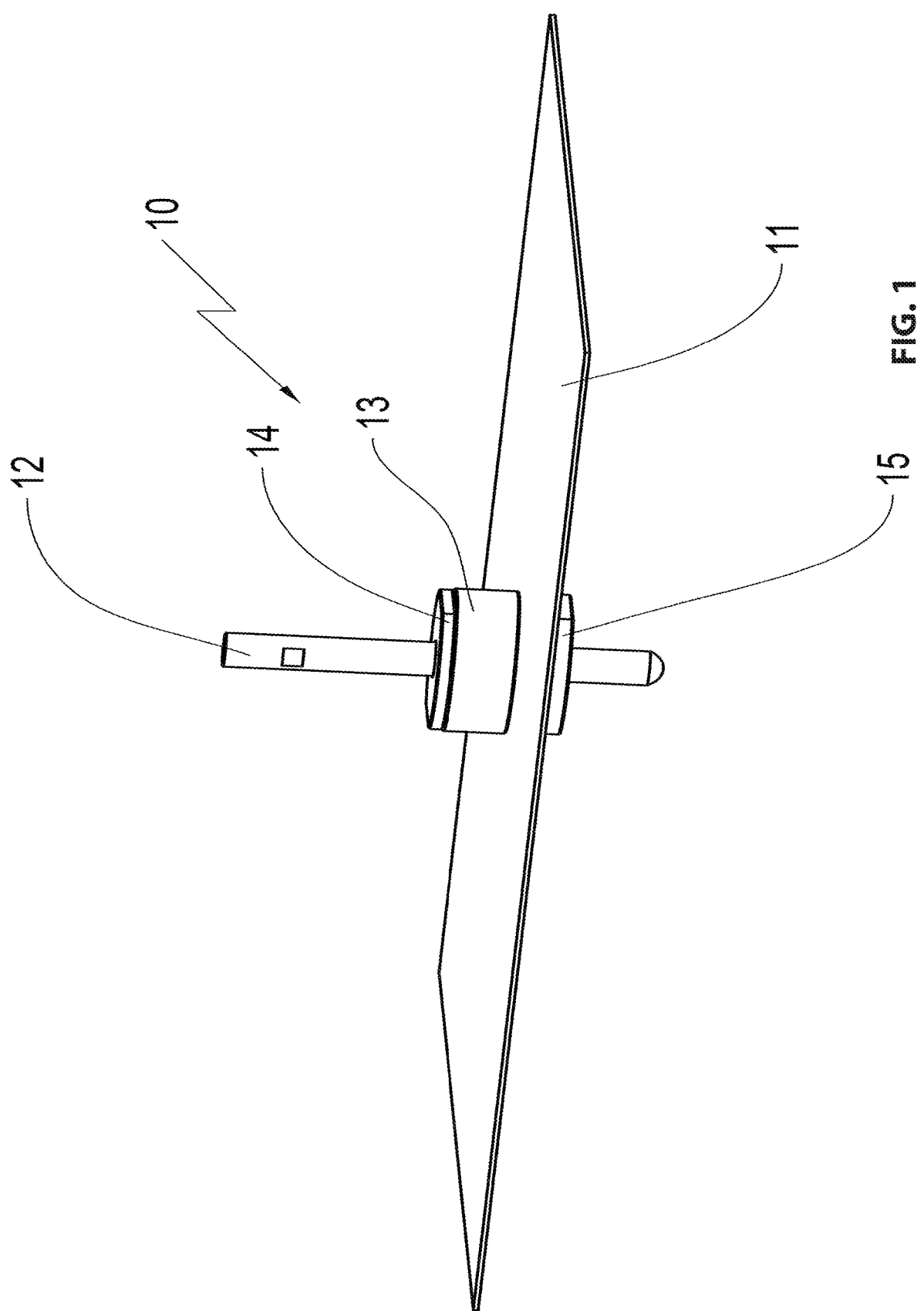
FIG. 1 illustrates a perspective view of the seal arrangement according to the invention inserted in a cooking cavity wall and including a light conductor rod received therein.

FIG. 1 shows the seal arrangement overall designated with reference numeral 10 fixed in a cooking cavity wall 11. The seal arrangement 10 includes a light conductor rod 12 for a light for a cooking apparatus. FIG. 1 shows that the seal arrangement includes a support element 13, a crimp ring 14 and an anchor ring 15.

The drawing figures of the embodiment show the cooking cavity wall 11 as a rectangular, essentially square piece of sheet metal, thus a part or a detail o a wall all that envelopes a cooking cavity of a cooking apparatus.

The individual parts of the seal arrangement 10 are now described with reference to FIGS. 4 and 5. These are an exploded perspective view in FIG. 4 and a sectional view along the sectional line III-III in FIG. 5.

The seal arrangement 10 is configured to receive a light conductor rod 12 in the insertion direction Y. Thus, the seal arrangement 10 and the support element 13 are provided with a receiving bore hole 16 which penetrates the support element 13 in its entirety in the insertion direction. This receiving bore hole 16 penetrates the crimp ring 14 and the anchor ring 15 in the same manner. Thus, the seal arrangement 10 including the support element 13, the crimp ring 14 and the anchor ring 15 are penetrated by a continuous receiving channel. The receiving channel coincides with the receiving bore hole 16 of the support element 13, the crimp ring 14 and the anchor ring 15.

The receiving bore hole 16 of the support element 13, includes an upward oriented inlet opening 17 and a downward oriented outlet opening 18.

The support element 13 furthermore includes a dead hole 19. The dead hole 19 is arranged concentric with the receiving bore hole 16, its diameter, however, is greater than a diameter of the receiving bore hole 16 of the support element 13. The dead hole opening coincides with the inlet opening 17 of the retaining element 13.

The dead hole base forms a support surface 20, that envelops the receiving bore hole 16 that penetrates the dead hole 19 in an annular shape.

The support element 13 forms an anchor spout 21 that is concentric with the receiving bore hole 16 and that extends away from the inlet opening 17 in the insertion direction Y and the outlet opening 18 of the receiving bore hole 16 of other support element 13 is arranged at a free end of the anchor spout.

A receiving groove 22 is formed at a bottom side of the support element 13 that is arranged opposite to the inlet opening wherein a groove opening 23 of the receiving groove 22 is oriented in the same direction as the outlet opening 18 and thus opposite to the dead hole opening. The receiving groove 22 is arranged in an annular shape about the anchor spout 21 and concentric to the receiving bore hole 16.

The seal arrangement 10 then includes a first seal ring 24 that is configured to contact the support surface 20 in the dead hole 19 and whose annular opening 25 is aligned with the receiving bore hole 16.

A second seal ring 26 is configured to be received in the receiving groove 22. The annular opening 27 is also arranged concentric with the receiving bore hole 16 of the support element 13.

A support ring 28 is optionally provided and seated in the dead hole 19 and in contact with the first seal ring 24. Thus, the optional support ring 28 is arranged between the crimp ring 14 and the first seal ring 24.

The crimp ring 14 includes a threaded spout 29 that is oriented towards the support element 13 and arranged concentric with the receiving bore hole 16 and provided with an external thread. The dead hole circumferential wall also includes a thread. The external thread of the threaded spout 29 of the crimp ring 14 and the thread of the dead hole circumferential wall form a thread pairing that facilitates threading the crimp ring 14 into the dead hole 19 of the support element 13.

As recited supra the anchor ring 15 also forms part of the seal arrangement 10. Thus, the anchor ring 15 includes an inner circumferential wall that defines the annular cavity 30 of the anchor ring 15. The wall has a thread that is complementary to an outer thread of the outer circumferential wall of the anchor spout 21. Both threads form a thread pairing that facilitates the threading of the anchor ring 15 onto the anchor spout 21.

Figure 4:
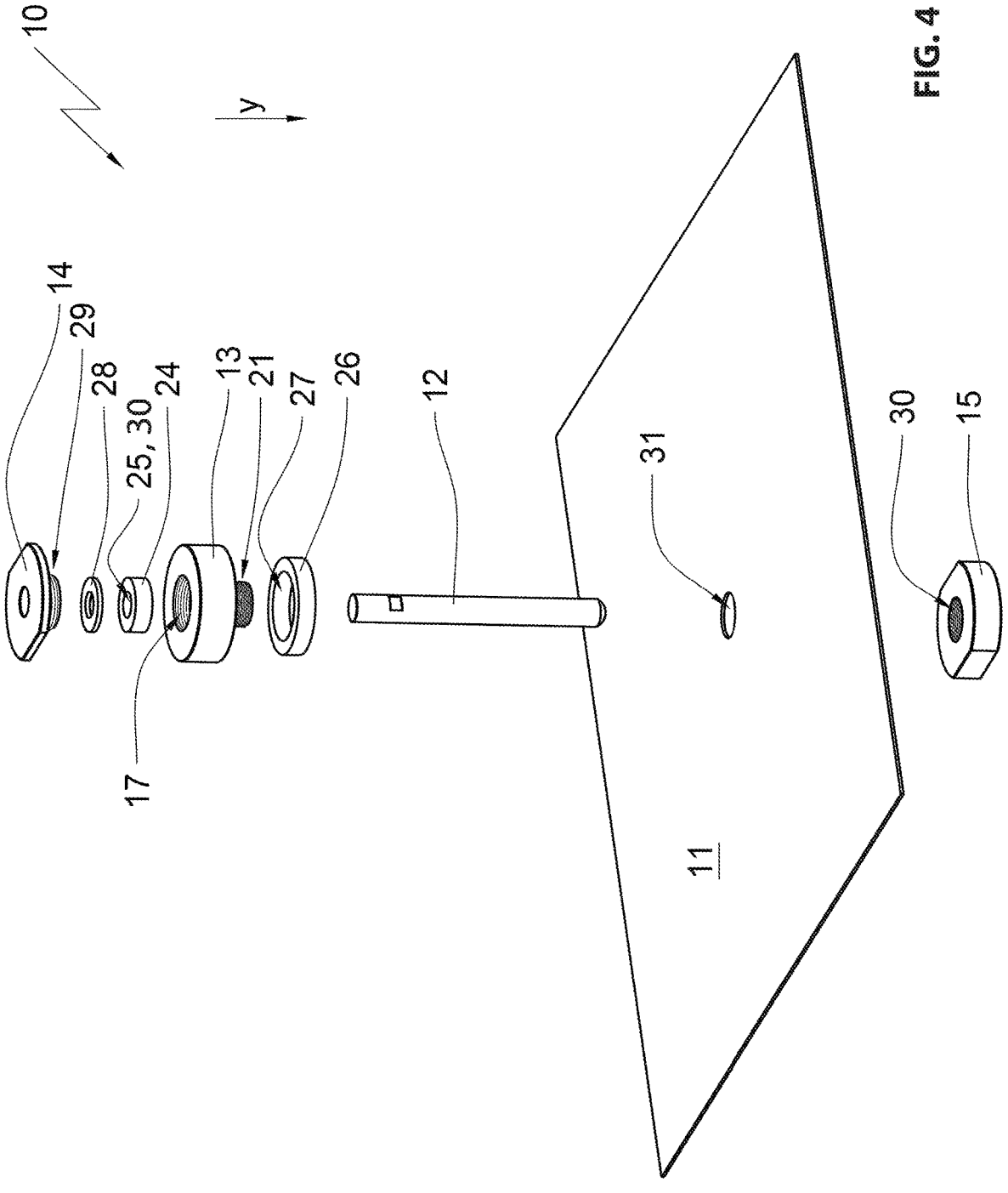
FIG. 4 illustrates the arrangement according to FIG. 1 in an exploded view.
Figure 5:
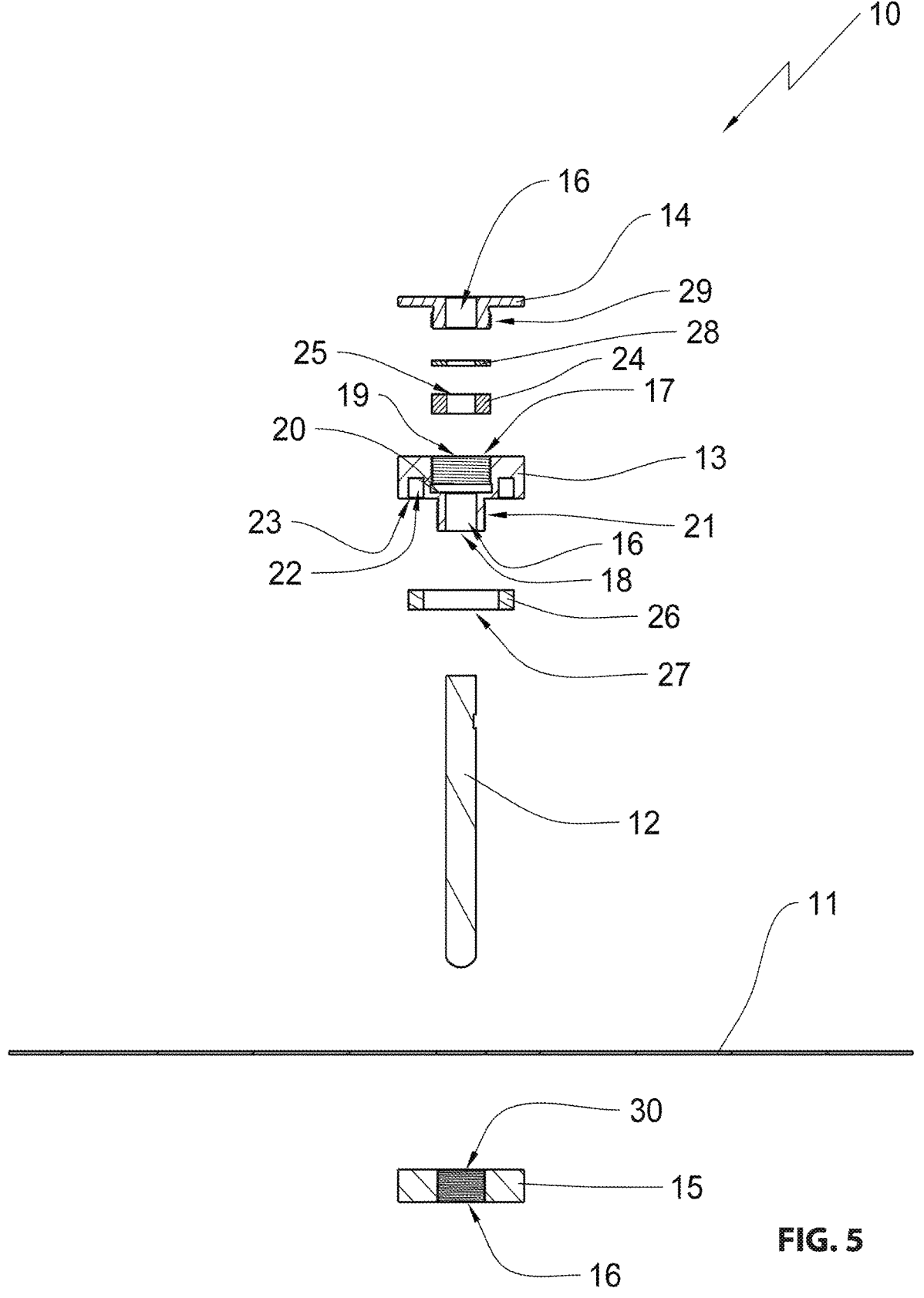
FIG. 5 illustrates the sectional view according to FIG. 3 in an exploded view.

It is evident from FIGS. 4 and 5 that threading the crimp ring 14 into the dead hole 19 applies a sealing force upon the first seal ring 14 so that the annular cavity of the first seal ring 24 will be constricted when the sealing force is large enough. Threading the anchor ring 15 onto the anchor spout 21 applies a sealing force upon the second seal ring 26 that is provided with an axial oversize relative to the groove depth, thus in the insertion direction Y. The second seal ring 26 is axially compressed by the sealing force applied through the anchor ring 15. Also, this axial compression causes a radial shape change so that the second seal ring 26 contacts the inner circumferential surfaces of the receiving groove 22 flush.

The seal arrangement 10 can form part of a cooking apparatus light in an advantageous embodiment. The light conductor rod 12 of this cooking apparatus light is shown in the drawing figures and inserted in the insertion direction Y into the receiving bore holes 16 or the receiving channel of the seal arrangement 10 and supported therein. The sealing forces applied by the crimp ring 14 upon the first seal ring 24 cause a diameter constriction of the annular cavity as stated supra. A light conductor rod 12 seated in the seal arrangement 10, in particular enveloped by the first seal ring 24 provides an opposite sealing surface at an outer circumferential wall of the light conductor rod 12. A first seal ring 24 contacting the outer circumferential wall of the light conductor rod 12 thus seals the receiving bore hole 16 against a passage of fluids.

In another embodiment of the invention, the seal arrangement 10 forms part of a cooking apparatus. The drawing figures show a detail of a cooking cavity wall of the cooking apparatus. Forming a part of the cooking apparatus the seal arrangement 10 supports at least the light conductor rod 12 of a cooking apparatus light as described supra. The second seal ring 26 contacts the outside of the cooking cavity wall 11, wherein the anchor spout 21 passes through a wall opening 31 of the cooking cavity wall 11. The anchor ring 15 is applied to the anchor spout 21 at an opposite side, typically at the inside of the cooking cavity wall 11. A threaded connection causes the support element 13 to be pulled against the cooking cavity wall 11 so that the second seal ring 26 is pulled into the receiving groove 22 filling the receiving groove 22 and is pressed against the outside of the cooking cavity wall. This way the passing cavity for the light conductor rod is sealed at the light conductor rod 12 and at the cooking cavity wall 11 by the seal arrangement 10.

This way the seal arrangement 10 provides a seal for a cooking apparatus light relative to the cooking cavity wall 11 of a cooking apparatus against typical cooking vapors that are generated when cooking in an oven, but also against vapor pressure in combination units which combine an oven function and a steam cooking function.

Instead of using a threaded pair for fixing the crimp ring 14 and the anchor ring 15 interlocking devices can be used as well, advantageously interlocking devices which provide plural interlocking positions that are sequentially arranged in the insertion direction 15 in order to be able to vary the insertion depth of the crimp ring 14 in the dead hole 19 and of the anchoring spout in the anchor ring 15 in order to achieve applicable sealing forces compensating also for material tolerances.

The seal rings 24 and 26 are arranged on an outside of the cooking cavity wall 11 and thus less exposed to cooking or pyrolysis temperatures than seal rings that are arranged directly in the wall opening 31 or on the inside of the cooking cavity wall 11. This way the temperature loading of the seal rings 24 and 26 is reduced.

The seal rings 24 and 26 can be fabricated from an elastomeric material which is typically a high temperature resistant high performance elastomeric material. Advantageously graphite hybrid components are used whose elasticity is comparatively low and which have to be fabricated with a high level of precision, but which have a temperature rating that is also suitable for pyrolysis capable units.

The optional support ring which contacts the first seal ring 24 in the insertion direction Y and which is thus arranged between the crimp ring 14 and the first seal ring 24 prevents a friction of the crimp ring 14 on the first seal ring 24. This prevents torsion forces generated when threading the crimp ring 14 from being transferred to the first seal ring 24.

Figure 2:
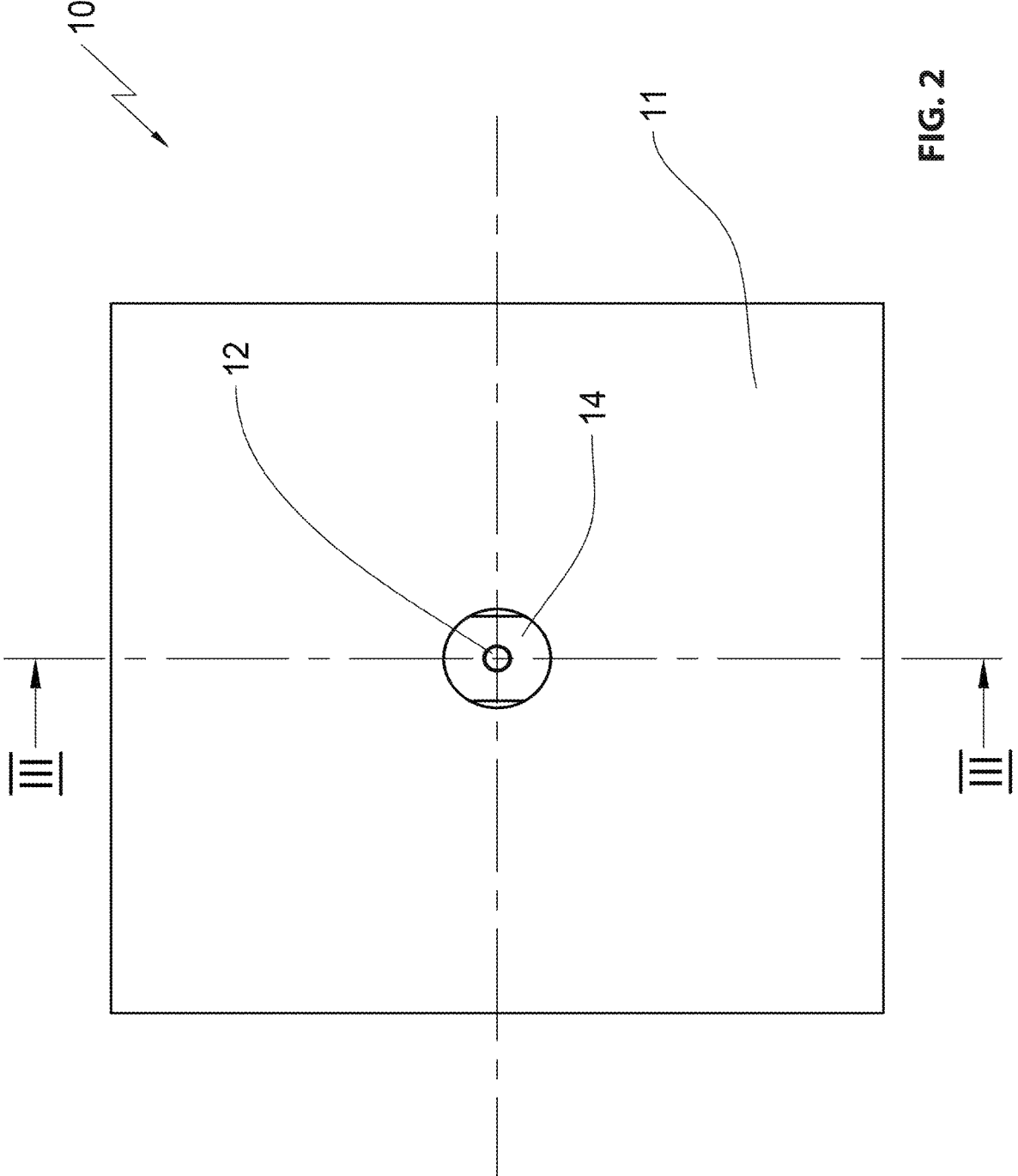
FIG. 2 illustrates a top view of the seal arrangement according to FIG. 1.
Figure 3:
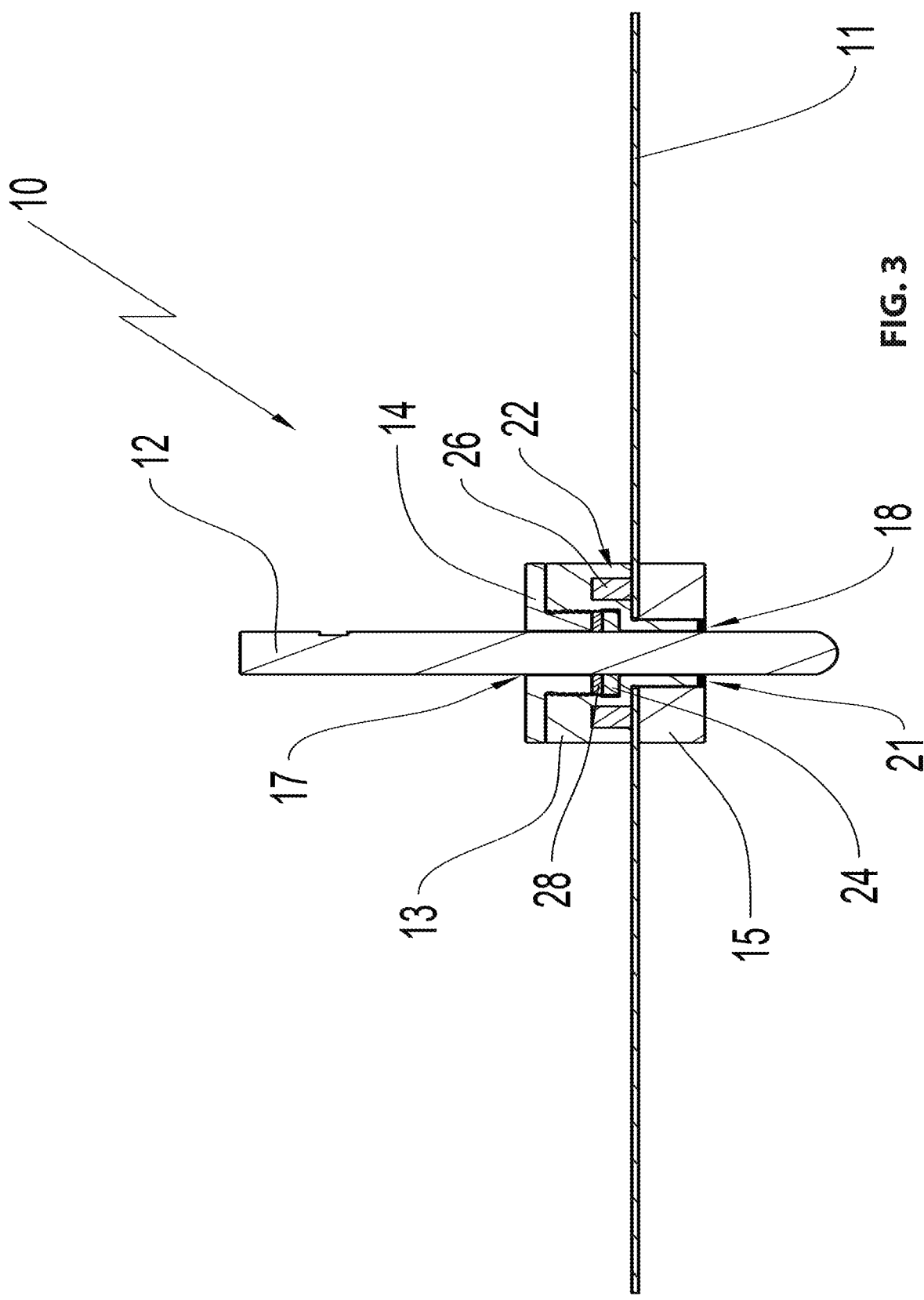
FIG. 3 illustrates a sectional view of FIG. 2 along a sectional line III-III.

FIG. 3 shows another sectional view according to sectional line III-III in FIG. 2 where individual components of the seal arrangement 10 are assembled and the seal arrangement 10 is anchored as part of a cooking apparatus with a cooking apparatus light in the cooking cavity wall 11.

In this illustration the light conductor rod 12 is seated in the seal arrangement 10. The light conductor rod enters through the entry opening 17 of the seal arrangement 10 and exits the seal arrangement 10 with its end through the exit opening 18 of the seal arrangement 10 so that light from a light source can be introduced into the cooking cavity of a cooking apparatus that is only represented by its cooking apparatus wall 11.

The crimp ring 14 is inserted into the support element 13, optionally with a support ring 28 in between and contacts the first seal ring 24. The first seal ring 24 is compressed by the applied sealing forces of the crimp ring 14 so that the diameter of the annular cavity of the first seal 24 is constricted so that the first seal contacts and seals the outer surface of the light conductor rod 12. This prevents a fluid exit along the light conductor rod 12 through the receiving bore hole 15 reliably.

The anchor spout 21 of the support element 13 penetrates the wall opening 31 of the cooking cavity wall 11. The anchor ring 15 is applied onto the anchor spout 21 from the cooking cavity wall side that is opposite to the support element 13. This way the cooking cavity wall 11 contacts between the anchor ring 15 and a bottom side of the support element 13.

The second seal ring seated in the receiving groove 22, contacts the cooking cavity wall 11. The anchor ring 15 imparts sealing force upon the second seal ring 26 which is axially pressed into the receiving groove 22 and fabricated with an axial oversize relative to the groove depth. The spring elastic deformation of the second seal ring 26, thus created causes a sealing contact of the seal ring 26 at the wall of the receiving groove 22 and a sealing contact at the cooking cavity wall 11. Thus, a fluid exit along boundary surfaces between the anchor ring 15 and the anchor spout 21 and further along the boundary surface between the support element bottom side and the cooking cavity wall 11 is reliably prevented.

It is evident from the description provided supra that a simple and advantageous seal arrangement 10 is provided. Using a small number of components, sealing along the receiving bore hole 16 for the light conductor rod 12, as well as sealing of the wall opening 31 of a cooking cavity wall 11 is implemented. Applying the sealing forces upon the seal rings 24 and 26 provides sealing in particular also against a steam pressure in the cooking cavity for a cooking apparatus with steam cooking capability.

Receiving the first seal ring 24 and the second seal ring 26 in a common support element 13 simplifies the seal arrangement 10 through component number reduction and facilitates a preassembly that simplifies transportation and correct installation of the seal arrangement when producing the cooking cavity light or the cooking apparatus.

The invention also relates to a cooking apparatus light that includes the seal arrangement 10 according to the invention. The seal arrangement 10 is characterized in particular by a light conductor rod 12 that penetrates the receiving bore hole 16 of the seal arrangement 10. Thus, the light conductor rod 12 is not only sealed in the seal arrangement 10 by the first seal ring 24. The light conductor rod 12 is also mechanically supported in the seal arrangement 10. When the illuminant is mechanically supported at the light conductor rod 12, the seal arrangement 10 can also mechanically support the cooking apparatus light.

The invention also relates to a cooking apparatus that includes a cooking apparatus light with a seal arrangement 10 according to the invention. In this cooking apparatus the seal arrangement 10 is mechanically supported at the cooking cavity wall by the anchor spout 21 and the anchor ring 15 applied thereto. Fixing the seal arrangement 10 at the cooking cavity wall 11 facilitates anchoring the cooking apparatus light at the cooking apparatus mechanically as described supra.

By choosing the materials accordingly, in particular for the hybrid components configured as the first seal ring 24 and the second seal ring 26, as well as using ceramic materials for the crimp ring 14, the anchor ring 15 and the support element 13, facilitates using the seal arrangement 10 in pyrolysis capable cooking apparatuses.

In an advantageous embodiment the seal arrangement 10 is used in combination units which combine at least an oven function and a steam cooking function.

REFERENCE NUMERALS AND
DESIGNATIONS

10 seal arrangement
11 cooking cavity wall
12 light conductor rod
13 support element
14 crimp ring
15 anchor ring
16 receiving bore hole
17 inlet opening of 13
18 outlet opening
19 dead hole
20 support surface
21 anchor spout
22 receiving groove
23 groove opening
24 first seal ring
25 ring opening
26 second seal ring
27 ring opening
28 support ring
29 threaded spout of 14
30 annular cavity of 15
31 wall opening
Y insertion direction

What is claimed is:

1. A seal arrangement for an illumination device of a cooking apparatus, the seal arrangement comprising:
a support element including a receiving borehole that penetrates the support element from top to bottom so that a light conductor rod is insertable into the receiving borehole in an insertion direction;
a dead hole having a dead hole diameter that is greater than a receiving bore hole diameter of the receiving borehole and arranged concentric with the receiving borehole in the support element wherein a dead hole opening of the dead hole coincides with an inlet opening of the receiving borehole that is arranged upstream in the insertion direction;
a first support surface that is formed by a base of the dead hole and that envelopes the receiving borehole in an annular shape where the receiving borehole penetrates the base of the dead hole;
an annular receiving groove that is arranged concentric with the receiving borehole and includes a receiving groove opening that is configured at a bottom of the support element viewed in the insertion direction so that the receiving groove opening is oriented opposite to the dead hole opening;
an anchor spout that originates from a bottom side of the support element and that is arranged concentric with the receiving borehole;
a crimp ring that is fixable in the dead hole;
an anchor ring that is attachable at the anchor spout;
a first seal ring that is arranged in the dead hole and contacts the first support surface wherein a ring cavity diameter of a ring cavity of the first seal ring substantially corresponds to the receiving borehole diameter of the receiving borehole;
a second seal ring arranged in the annular receiving groove with an oversize relative to an axial depth of the annular receiving groove,
wherein the crimp ring fixed in the dead hole imparts a first axial sealing force upon the first seal ring, and wherein the anchor ring attached at the anchor spout imparts a second axial sealing force upon the second seal ring.

2. The seal arrangement according to claim 1, wherein the crimp ring is mountable in the dead hole by a first thread connection of the crimp ring and a dead hole wall of the dead hole.

3. The seal arrangement according to claim 1, wherein the anchor ring is mountable at the anchor spout by a second thread connection of the anchor ring and an anchor spout wall of the anchor spout.

4. The seal arrangement according to claim 1, wherein a support ring is arranged axially between the crimp ring and the first seal ring, and wherein the support ring transfers the first axial sealing force from the crimp ring to the first seal ring.

5. A light for a cooking appliance, comprising:

the seal arrangement according to one of the claim 1;

the light conductor rod inserted in the receiving bore hole, wherein the ring cavity diameter of the first seal ring is reduced by the first axial sealing force imparted the crimp ring so that an inner diameter of the first seal ring contacts and seals at an outer diameter of the light conductor rod.

6. A multi-function oven with a steam cooking capability, comprising:

the light according to claim 5;

an opening in a cooking cavity wall wherein the anchor spout with the light conductor rod of the light passes through the opening, wherein the second seal ring contacts a surface of the cooking cavity wall and is axially compressed by the sealing force of the anchor ring and contacts and seals at the cooking cavity wall and in the receiving groove.

7. The multi-function oven according to claim 6, wherein the first seal ring and the second seal ring are arranged on a side of the cooking cavity wall that is oriented away from the cooking cavity.

8. The multi-function oven according to claim 6, wherein the light is mechanically supported by a connection of the seal arrangement at the cooking cavity wall through the light conductor rod being seated in the receiving bore hole.

\* \* \* \* \*